June 23, 1964 — R. E. POWERS — 3,137,858
RING-SHANK-FASTENER
Original Filed Feb. 15, 1961
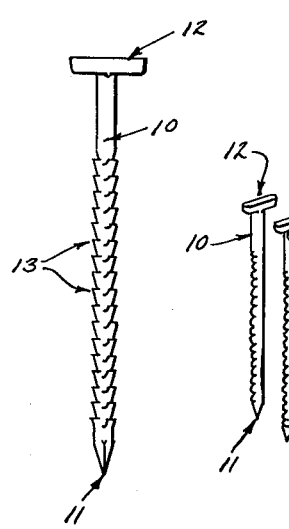
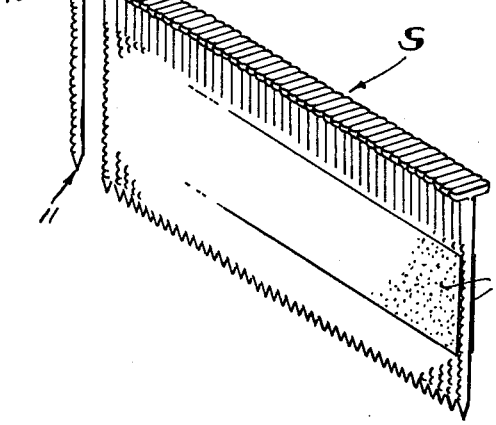
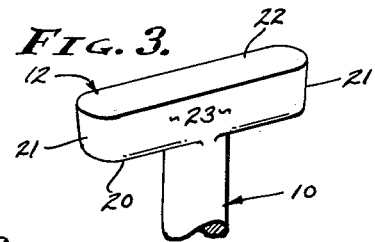
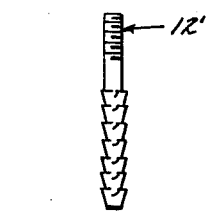
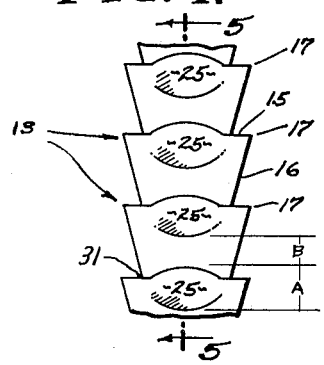
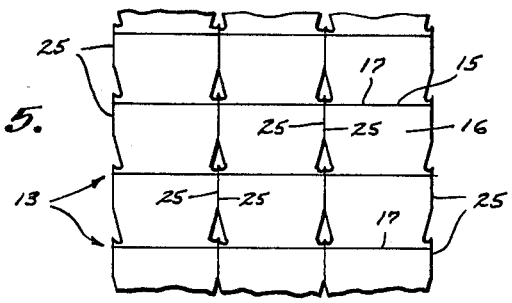
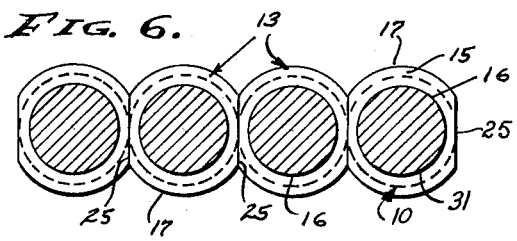
INVENTOR.
RICHARD E. POWERS
BY
V. H. Maxwell
AGENT

United States Patent Office 3,137,858
Patented June 23, 1964

3,137,858
RING-SHANK-FASTENER
Richard E. Powers, Monterey Park, Calif., assignor to Powers Wire Products Company, Inc., Los Angeles, Calif., a corporation of California
Continuation of application Ser. No. 89,441, Feb. 15, 1961. This application June 4, 1963, Ser. No. 285,486
10 Claims. (Cl. 1—56)

This invention is concerned with a special fastener referred to in the art as a ring-shank type of fastener, and more particularly it relates to such a ring-shank-nail, or the like, that can be supplied in "stick" formation and adapted to be driven from a mechanical drive tool and directly into work to be fastened.

This application is co-pending with and is filed as a continuation of my application Serial No. 89,441, filed February 15, 1961, entitled "Ring-Shank-Fastener," now abandoned.

The fastener driving art is well developed in connection with tools for driving fasteners and such tools are characteristically pneumatically operated to drive the fasteners one at a time as they are received from a magazine supply. Although there are nailing machines which, for example sort individual nails from a storage bin type of supply (also riveting machines etc.) and properly face them and drive them one at a time, it has been more practical to supply a multiplicity of fasteners in the so-called "stick" form and to sever one fastener at a time from said "stick" to simultaneously drive it. This is particularly true with U-shaped staple fasteners and also with a multitude of odd-shaped fasteners. In order to produce a stick of fasteners, the said fasteners are simply aligned parallel and adjacent to each other and they are adhered together in this relationship, thereby forming said "stick." In practice, an adhesive body is applied and which glues or cements the multiplicity of like or identical fasteners into said stick formation.

The ordinary and common ring-shank-nail is characterized by its elongate shank, sharpened at one end, with a head at the other end, and with circular rings throughout a substantial length of the shank. This particular type of nail has extremely high holding properties afforded by the toothed configuration of the shank comprising a multiplicity of rings of toothed formation. Further, the ring or toothed shape is slanted for ease of penetration and in order to increase resistance to withdrawal.

The ring-shank-nail, as above described in its general and accepted form, is not adaptable to use in mechanical driving tools for two specific reasons: firstly, the heads of such nails are usually round; and secondly, the toothed formation of the shanks does not permit freedom of movement of adjacently related nails, one longitudinally relative to the other. Therefore, the usual ring-shank-nail cannot be arranged in order to establish a "stick" for use in a driving tool, because it is impossible to do so with round heads and because no other orienting feature is present on such a nail. And, the usual ring-shank-nail cannot be driven by a driving tool of the type under consideration, because the rings would catch one upon another, of adjacently related nails.

A general object of this invention is to provide a ring-shank-fastener that can be supplied in "stick" formation and which can be then driven individually by a mechanical driving tool.

An object of this invention is to provide a ring-shank-fastener with a head formation that permits orientation of the fasteners, laterally and one adjacent another, in a "stick" formation supply, and whereby a multiplicity of said fasteners can be joined together, as a unit, as by means of adhesion or the like.

Another object of this invention is to provide a ring-shank-fastener with a shank formation that permits relative longitudinal movement between adjacently related and contacting fasteners, so that one can be severed from the others in a "stick" formation to be driven into work to be fastened.

It is still another object of this invention to provide a fastener of the character thus far referred to that is commercially practical in that it can be readily manufactured, and in that it is substantially unaltered in its holding ability when driven by a mechanical driving tool.

The various objects and features of this invention will be fully understood from the following detailed description of the typical preferred forms and applications thereof, throughout which description reference is made to the accompanying drawings, in which:

FIG. 1 is an elevation of an individual ring-shank-nail as it is formed in accordance with the present invention.

FIG. 2 is a perspective view showing the orientation of a plurality of nails in "stick" formation.

FIG. 3 is an enlarged perspective view of the head portion of the nail.

FIGS. 3a and 3b are views like FIG. 1 and showing two modified forms of the fasteners, with head formations different from the head formation shown in FIG. 3, FIG. 3a showing a stud type fastener where in the head portion is not enlarged, and FIG. 3b showing a finish-nail wherein the ringed portion of the shank forms the enlarged head portion.

FIG. 4 is an enlarged detailed view of a portion of the nail shank shown in FIG. 1.

FIG. 5 is an elevation of the portion of structure shown in FIG. 4 and taken as indicated by line 5—5 on FIG. 4.

FIG. 6 is a sectional view showing the orientation of a plurality of shanks as they are related to each other in FIG. 2.

The method employed to produce the ring-shank-fastener that I provide as an article of manufacture can vary, it being preferred to process steel wire by means of cutting, rolling, heading and pressing. The said ring-shank-fastener as a finished article is shown in FIG. 1 and it comprises, generally, a straight elongate cylindrical shank 10 that is basically round in cross-section and pointed at 11 at its lower terminal end. It is to be understood that the point portion of the fastener can vary and, for example it can be sharp as shown in FIG. 1, or it can be blunt as shown in FIG. 3a, or it can be rounded as shown in FIG. 3b. The head portion 12 is at the upper end of the fastener, said head portion being a transverse member the same thickness as the nail shank 10 and substantially wider than said shank. It is to be understood that the head portion 12 can vary, and need not be enlarged, as clearly illustrated in FIG. 3a, which shows a head portion 12' in the form of a threaded stud. The shank 10 is characterized by the formation of a multiplicity of rings 13 therein, said rings occupying the major portion of the shank and formed therein as by a rolling process performed either before or after forming of the head 12 and point 11.

The shank 10 is essentially a round part, being formed of round wire that is straightened. The toothed formation of the shank 10 or outer cylindrical surface thereof is established by rolling a multiplicity of rings 13 therein, said rings being shaped to present upwardly disposed teeth. It is to be understood, however, that said ring formation can be varied as circumstances require without deviating from the present invention. As shown, the rings have a flat upper face 15 in a plane normal to the axis of the shank 10, and the rings have a cone-shaped lower face 16 tapered inwardly to the next lowermost ring 13 to define annular grooves as at 31.

The head portion 12 shown in FIG 1 is an elongate transversely disposed part extending equally at diametrically opposite sides of the shank 10 and with a convex bottom 20 and rounded ends 21. The top 22 of the head portion is flat and the front and/or rear faces 23 are substantially flat and parallel and tangent to the outside diameter of the shank 10. Thus, the general configuration of the nail of the first form of the invention is that of a T, said T configuration affording adequate means to orient a plurality of nails together for joinder by means of adhesion, as by means of adhesive material or body 24 thereof, at opposite sides, thereby producing a "stick" S of a plurality of nail fasteners.

Assuming that the rings 13 are formed by the process of rolling, then the material of the shank is upset and raised so that the edge 17 of the ring is at a larger diameter than the normal shank diameter and the groove diameter at 31 is correspondingly less than the normal shank diameter. The said larger diameter is also outside the thickness of the head portion 12 (between the faces 23). In accordance with the invention, diametrically opposite portions of the rings 13 are removed or flattened to a plane coincidental with the said faces 23 and/or outside diameter of the shank 10. It is preferred that pressure be applied to the rings 13 at said opposite faces of the head portion 12 in order to reduce the projecting portions of the rings 13 and establishing in place thereof lands 25. The said lands 25 can assume any elevational configuration, which will be a result of the initial shape of the rings 13 and the flow of material when pressure is applied to move the same.

In practice, the rings 13 are initially upset to a height that will permit flattening of the rings to form lands 25 at least as wide as the space extending between adjacent lands, longitudinally of the shank 10. That is, the distance A (see FIG. 4) is at least as great as the distance B. In this way, two adjacent shanks 10 cannot be interlocked by engagement of the toothed formation of the shank 10, as is the case in an ordinary nail of the type under consideration.

With the ring shanks 10 flatened, as above described, a plurality of shanks 10 can be arranged face-to-face. That is the faces 23 and 25 of one shank can have flat engagement with the faces 23 and 25 of the next adjacent shank. However, it is to be understood that the lands 25 can be arranged face-to-face without touching together of the adjacent shanks and heads. That is, upset and raised lands 25 can be relied upon as the sole means to join and orient adjacent fasteners one next to the other. The fasteners are formed so that each is substantially identical to the other whereby the faces and/or lands 23 and 25, respectively, are opposed. In this way, the fasteners stack in straight in-line relationship, and when pressure is applied longitudinally of a fastener, the endmost one, it is separable from the remaining fasteners of the "stick" S, all without danger of interlocking as the lands 25 slide from one to the other. It is to be understood that the process of severance occurs in the shearing and driving action that takes place in a fastener driving tool used in connection with the "stick" S of the ring-shank-nails herein provided.

From the foregoing, it will be apparent that the ring-shank-nail of FIG. 1 is of T formation with the rings flattened at the diametrically opposite faces of the nail-shank and coincidental with the faces 23 of the head portion 12. It is a nail of said above specified configuration that is adapted to be used in a mechanical driving tool such as, for example, a pneumatically operated tool having a driver blade that is driven through a guide-way passing the nail from the "stick" S to the work to be fastened. The ring-shank-stud of FIG. 3a is without an enlarged head in which case the lands 25, above described, are the sole means of joining and aligning the fasteners in the formation of a stick. In FIG. 3b I have shown a third form of fastener wherein a limited number of rings 13' are provided at the head portion 12". In this third form the rings are identical to the rings above described and thereby establish a slightly enlarged head, and useful as a "ring-head-finish-nail." The nail of the present invention is to be distinguished from the ordinary prior art nails that cannot operate through such a tool, or guide-way thereof, and which inherently interlock one with the other when arranged in side-by-side relationship.

Having described only the typical preferred forms and applications of my invention, I do not wish to be limited or restricted to the specific details herein set forth, but wish to reserve to myself any modifications or variations that may appear to those skilled in the art and fall within the scope of the following claims.

Having described my invention, I claim:

1. A ring-shank-fastener of the character described including, an elongate cylindrical shank, and a multiplicity of longitudinally spaced, radially outward extending rings formed in said shank, said rings having flat outer surfaces at two spaced locations around the circumference of said shank.

2. A ring-shank-fastener of the character described including, an elongate cylindrical shank, and a multiplicity of alternate circumferential rings and grooves formed in said shank, said rings having flat outer surfaces on diametrically opposite sides of said shank, said flat surfaces being spaced radially outward from the longitudinal axis of said shank a greater distance than the base of said grooves.

3. A ring-shank-fastener of the character described including, an elongate cylindrical shank with its outer surface upset to define a multiplicity of alternate rings and grooves, said rings having flat outer surfaces on diametrically opposite sides of said shank, said surfaces lying in planes tangent to the normal circumference of said shank.

4. A ring-shank-fastener of the character described including, an elongate cylindrical shank with its outer surface upset to define a multiplicity of parallel rings and grooves around the circumference of said shank, and a head portion at one end of said shank with opposite faces in planes parallel to the longitudinal axis of said shank, said rings having flat outer surfaces lying in said planes.

5. A ring-shank-fastener of the character described including, an elongate cylindrical shank with its outer surface upset to define a multiplicity of parallel rings and grooves around the circumference of said shank, said rings having flat outer surfaces lying in planes parallel to the longitudinal axis of said shank and spaced radially outward from the base of said grooves, said flat outer surfaces extending parallel to said axis a distance at least as great as the distance between adjacent edges of said flat outer surfaces.

6. A ring-shank-fastener according to claim 5 wherein said flat surfaces lie in planes tangent to the normal circumference of said shank.

7. A ring-shank-fastener of the character described including, an elongate cylindrical shank with its outer surface having upset portions defining a multiplicity of parallel rings and grooves around the circumference of said shank, said upset portions having a right circular conical cross section transverse to the longitudinal axis of said shank, said rings having flat outer surfaces lying in planes parallel to the longitudinal axis of said shank and spaced radially outward from the base of said grooves.

8. A ring-shank-fastener of the character described including, an elongate shank in the form of a right circular cylinder having a point on one end and a head on the other end, at least a portion of said shank intermediate said ends having upset portions defining a multiplicity of alternate parallel rings and grooves around the circumference of said shank, said upset portions having a right circular conical cross section transverse to said axis tapering radially outward in the direction of said head and terminating in a flat face transverse to said axis, said rings having flat outer surfaces lying in planes parallel to said axis and spaced radially outward from the base of said grooves, said flat outer surfaces extending parallel to said axis a distance at least as great as the distance between adjacent edges of said flat outer surfaces.

9. A stick of ring-shank-fasteners for use in a driving tool that severs a single fastener from said stick and drives it, and including, a plurality of said fasteners arranged in side by side abutting relation and each comprising an elongate cylindrical shank, and a multiplicity of longitudinally spaced, radially outward extending rings formed in said shank, said rings having flat outer surfaces at two spaced locations around the circumference of said shank, and means adhering said plurality of fasteners together.

10. A stick of ring-shank-fasteners for use in a driving tool that severs a single fastener from said stick and drives it, and including, a plurality of said fasteners arranged in side by side abutting relation and each comprising an elongate shank in the form of a right circular cylinder having a point on one end and a head on the other end, at least a portion of said shank intermediate said ends having upset portions defining a multiplicity of alternate parallel rings and grooves around the circumference of said shank, said upset portions having a right circular conical cross section transverse to said axis tapering radially outward in the direction of said head and terminating in a flat face transverse to said axis, said rings having flat outer surfaces lying in planes parallel to said axis and spaced radially outward from the base of said grooves, said flat outer surfaces extending parallel to said axis a distance at least as great as the distance between adjacent edges of said flat outer surfaces, and means adhering said plurality of fasteners together.

No references cited.